M. J. FARRIER, Jr.
CAR BRAKE.
APPLICATION FILED FEB. 7, 1912.
1,047,022.
Patented Dec. 10, 1912.
2 SHEETS—SHEET 2.
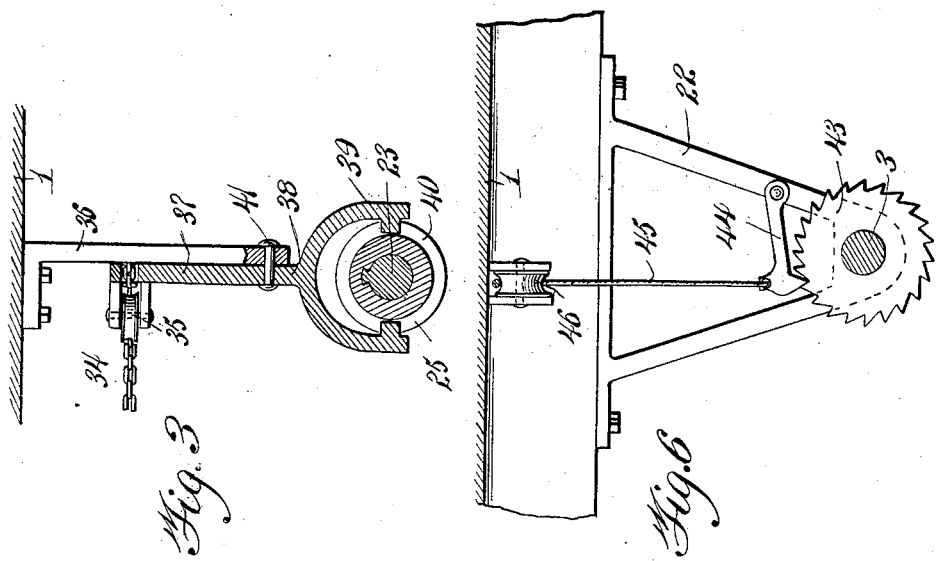
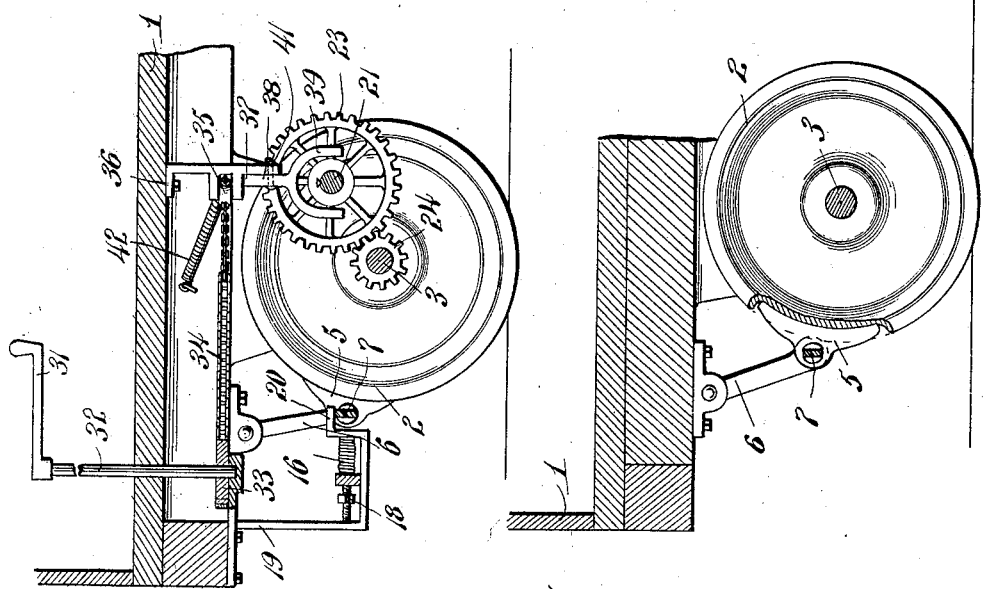
Witnesses
W. S. M<sup>c</sup>Dowell
P. M. Smith
Inventor
Mervin J. Farrier Jr.
By Victor J. Evans.
Attorney

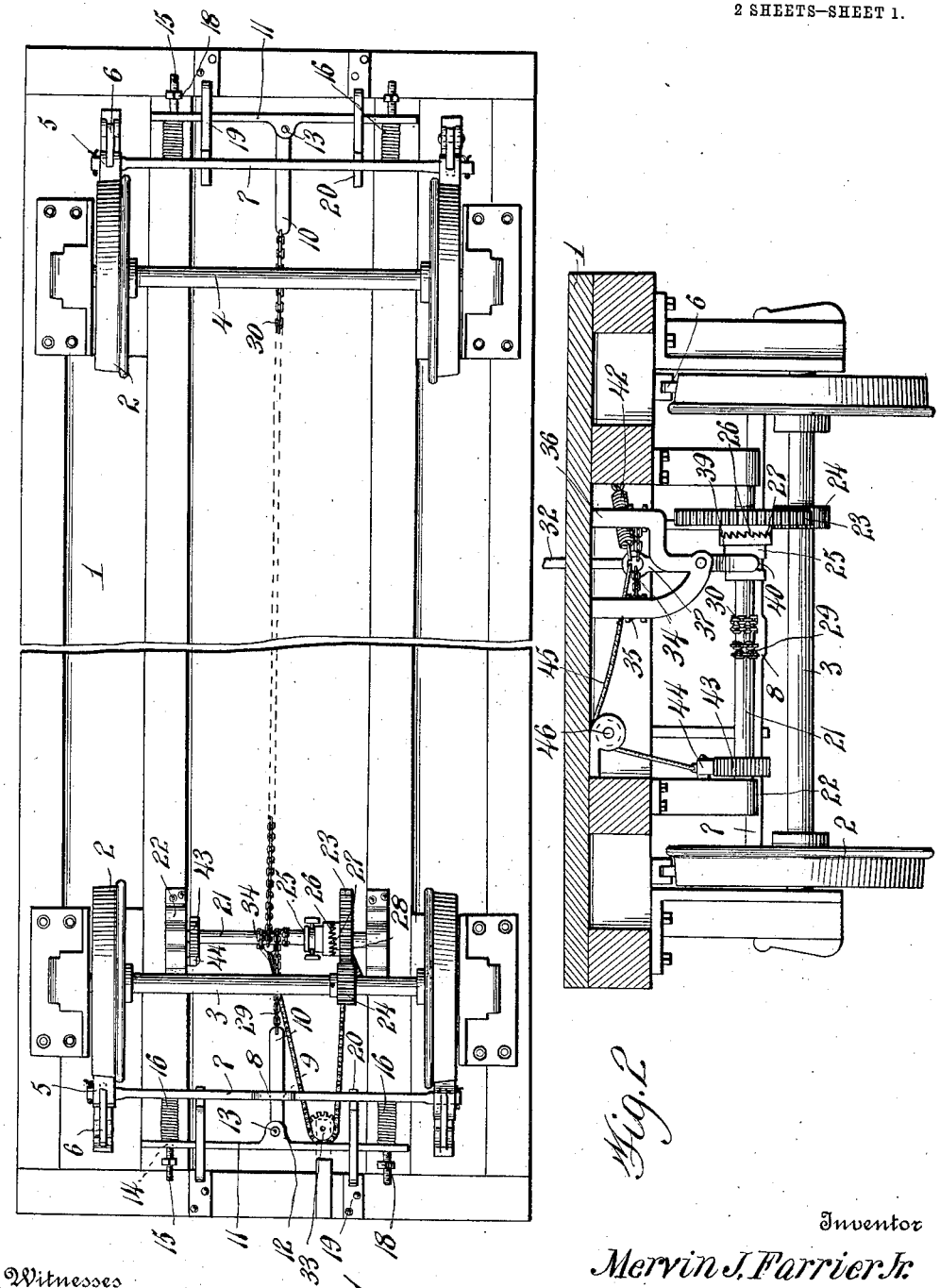

UNITED STATES PATENT OFFICE.

MERVIN J. FARRIER, JR., OF NEW ORLEANS, LOUISIANA, ASSIGNOR OF ONE-FOURTH TO ERNEST H. PIHLSTROM, ONE-FOURTH TO CHARLES F. ALBA, AND ONE-FOURTH TO WARREN L. THOMPSON, ALL OF NEW ORLEANS, LOUISIANA.

CAR-BRAKE.

1,047,022.      Specification of Letters Patent.      Patented Dec. 10, 1912.

Application filed February 7, 1912. Serial No. 676,062.

*To all whom it may concern:*

Be it known that I, MERVIN J. FARRIER, Jr., a citizen of the United States, residing at New Orleans, in the parish of Orleans and State of Louisiana, have invented new and useful Improvements in Car-Brakes, of which the following is a specification.

This invention relates to car brakes and has for its object the provision of a simple, reliable and economical manually operated mechanical brake especially designed for street cars, which will enable the driver to set the brakes with any desired pressure and leave the same set at such pressure, or increase or decrease the pressure as may be found expedient, and release or throw off the brakes after the car has been brought to a stop.

A further object of the invention is to provide a brake of the class above referred to embodying means whereby the pressure of the brake shoes against the wheels is equalized at all times during the application of the brakes.

With the above and other objects in view, the invention consists in the construction, combination and arrangement of parts, set forth in and falling within the scope of the appended claims.

In the drawings:—Figure 1 is a bottom plan view of a car, showing the invention applied thereto. Fig. 2 is a vertical cross section taken in front of one of the axles. Fig. 3 is a detail cross section, showing the relation of the clutch to the countershaft. Fig. 4 is a vertical longitudinal section taken about centrally. Fig. 5 is a detail vertical longitudinal section adjacent to one of the brake beam supporting brackets. Fig. 6 is a side elevation of the pawl and ratchet mechanism.

In the accompanying drawings, 1 designates the platform of a street car, 2 the wheels thereof, 3 and 4 the axles, 5 the brake shoes and 6 the supporting links by which the brake shoes are supported at the proper elevation beneath the car body and adapted to move into and out of engagement with the wheels.

In carrying out the present invention, the brake shoes of each pair of wheels are connected by a brake beam 7, the brake shoes being mounted for pivotal movement upon the opposite ends of said brake beam. Centrally, the brake beam is enlarged, as shown at 8, and such enlarged part is apertured, as shown at 9, to receive a draft link 10 which is adapted to slide back and forth through the aperture 9.

Arranged outside of the brake beam is an equalizing bar 11, having inwardly extending lugs 12 between which the outer extremity of the draft link is pivotally connected, as at 13. The opposite ends of the draft bar are formed with openings 14 to adapt the same to slide inward and outward on pins or guides 15, while springs 16 are interposed between the draft bar and brake beam, which springs encircle the guide pins. It may be found convenient to thread the guide pins and provide the same with nuts 18 which may be set inward or outward to limit the outward movement of the equalizing bar in a manner which will be readily understood, for the purpose of preventing the parts from "chattering" when the brakes are not in use.

Extending downward from the bottom of the car body are supporting brackets 19 upon which the equalizing bar above described is adapted to slide toward and away from the axle. The extremities of said brackets are bent upward and inward to form lips 20 which extend over the top of the brake beam.

Arranged adjacent to the axle is a countershaft 21 journaled in suitable hangers 22 secured to the car body. This countershaft has loosely mounted thereon a gear wheel 23 which meshes with a pinion 24 fast on the car axle, said gear wheel being, therefore, continuously driven by the pinion while the car is in motion.

25 designates a sliding clutch mounted to move lengthwise upon the countershaft and provided with teeth 26 movable into and out of engagement with corresponding teeth 27 on the hub 28 on the gear wheel above referred to. The clutch is feathered to the shaft so that when said clutch is in engagement with the toothed hub of the gear wheel, the countershaft will be caused to revolve. Extending from the countershaft to the draft link above described, is a flexible connection 29 such as a chain, one end thereof being attached to the countershaft so as to be wound thereon during the rotation of said countershaft. It will thus be seen that as the countershaft turns and winds up the chain, the draft link is drawn inward toward the countershaft causing a corresponding movement of the equalizing bar whereupon the tension springs are compressed and a yielding pressure is thereby imparted to the brake beam and consequently to the brake shoes which are thrust firmly but yieldingly against the car wheels.

It will, of course, be understood that the wheels at the opposite end of the car are correspondingly equipped with brake mechanism, as shown in Fig. 1, and such brake mechanism at the opposite end of the car is operated by another flexible connection or chain 30 arranged to wind upon the same countershaft above described.

The clutch is shifted by means of a manually operated lever 31 on the upper end of a vertical staff 32 which passes through the car platform and has fast on the lower end thereof a sprocket wheel 33 around which runs a chain 34. The opposite ends of the chain 34 pass around guide pulleys 35 journaled in a suitable bracket 36 and are attached at their inner ends to the upper arm 37 of a clutch throwing lever, the lower arm 38 of which is provided with a fork 39 engaging a groove 40 in the clutch, as clearly shown. The clutch throwing lever is pivotally mounted at 41 on the bracket referred to. The clutch is normally held out of engagement with the gear wheel by means of a spring 42 having one end attached to the car body and the other end connected to the upper arm of the clutch throwing lever.

Mounted upon the countershaft is a ratchet wheel 43 adapted to be connected by a pawl 44 pivotally mounted on one of the hangers above referred to. A flexible connection 45 extends from said pawl upward over a pulley 46 attached to the car body and has its opposite end connected to the upper arm of the clutch throwing lever. The connection which operates the pawl referred to is of such length that in the manipulation of the manually operated control lever, the clutch may be first shifted out of engagement with the gear wheel on the countershaft and by a further movement of said manually operated lever the pawl is thrown out of engagement with the ratchet, which thereby releases the brake mechanism and effects a throwing off of the brake shoes from the wheels.

In operation, when it is desired to apply the brakes, the motorman turns the manually operated lever so as to throw the clutch into engagement with the gear wheel on the countershaft. This causes the countershaft to rotate and wind up the connection or connections to the brake or brakes. The longer the clutch is allowed to remain set, the more tightly will the brakes be applied. After the brakes have been applied as tightly as necessary, the motorman moves the manually controlled lever in the opposite direction and thereby throws the clutch out. When it is desired to throw the brakes off entirely, the manually-operated lever is carried farther by the motorman, thereby throwing the pawl out of engagement with the ratchet and permitting the equalizer springs to act through the equalizer bar, draft link and flexible connections to revolve the countershaft in the opposite direction.

I claim:—

1. In a car brake, a revolving car axle actuated by the wheels, a pinion fast thereon, a countershaft, a gear wheel loose thereon driven by the pinion, a sliding clutch feathered to the countershaft, a brake beam and shoes, a flexible connection adapted to be wound around the countershaft and to draw the brake beam toward the wheels, pawl and ratchet mechanism for holding the countershaft against rotation, and a single manually operated element adapted both to shift the clutch and release the pawl and ratchet mechanism.

2. In a car brake, a revolving car axle actuated by the wheels, a pinion fast thereon, a countershaft, a gear wheel loose thereon driven by the pinion, a sliding clutch feathered to the countershaft, a brake beam and shoes, a flexible connection adapted to be wound around the countershaft and to draw the brake beam to the wheels, pawl and ratchet mechanism for preventing rotation of the countershaft, and manually operated means arranged to first throw out the clutch and subsequently release the pawl and ratchet mechanism.

3. In a car brake, a revolving car axle actuated by the wheels, a pinion fast thereon, a countershaft, a gear wheel loose thereon driven by the pinion, a sliding clutch feathered to the countershaft, manually operated means for shifting said clutch, a brake beam provided with a central guiding aperture, shoes mounted on said beam, an equalizing bar, springs interposed between said equalizing bar and brake beam, a draft link connected to said equalizing bar and working through the aperture in the brake beam, and a flexible connection adapted to be wound around the countershaft and attached to said draft link.

4. In a car brake, a revolving car axle actuated by the wheels, a pinion fast thereon, a countershaft, a gear wheel loose thereon driven by the pinion, a sliding clutch feathered to the countershaft, manually operated means for shifting said clutch, a brake beam and shoes, a flexible connection adapted to be wound around the countershaft and to draw the brake beam toward the wheels, an equalizing bar, springs interposed between said equalizing bar and the brake beam, and one or more brackets having supporting portions underlying said equalizer bar.

In testimony whereof I affix my signature in presence of two witnesses.

MERVIN J. FARRIER, Jr.

Witnesses:
ERNEST H. PIHLSTROM,
ADAM SCHAFF.